United States Patent Office 3,242,141
Patented Mar. 22, 1966

3,242,141
POLYAMIDE COMPOSITIONS FROM FATTY DIMER DIAMINES
Leonard R. Vertnik and Harold Wittcoff, Minneapolis, Minn., assignors to General Mills, Inc., a corporation of Delaware
No Drawing. Filed Dec. 4, 1962, Ser. No. 242,068
9 Claims. (Cl. 260—78)

This invention relates to high molecular weight polymeric compounds and to the process of preparing same. More particularly it relates to polyamides prepared from fatty dimer diamines and certain acidic compounds. These polymers are useful for coatings, adhesives and molding compounds. The polymers exhibit improved low temperature flexibility and elongation, low water absorption and improved abrasive resistance than known linear polyamides.

It is one object of our invention to provide new polyamides of dimer diamines and aliphatic and cycloaliphatic hydrocarbon dibasic acids, chlorides and esters.

Another object of the present invention is to provide such polyamides wherein a portion of the dimer diamine is replaced by one or more additional diamines.

A further object is to provide new and valuable polyamides which are useful as casting resins, surface coatings, adhesive materials, fiber forming compositions and the like.

Still another object of the invention is to provide a method of preparing the above described polyamides.

We have discovered that high molecular weight polymeric products can be obtained by reacting dimer diamines with aliphatic or cycloaliphatic hydrocarbon dibasic acids, chlorides and esters. Additionally, a portion of the dimer diamine can be replaced by a second diamine. The linear polyamides have the following recurring structural unit:

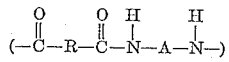

where R is an aliphatic or cycloaliphatic hydrocarbon radical having from 2 to 20 carbon atoms and A is selected from the group consisting of R' and mixtures of R' and R'' where R' is a dimeric fat radical and R'' is a radical derived from a diamine other than the dimer diamine. The polyamides are normally prepared from equivalent amounts of the diamine and aliphatic acidic compound. In such cases they can be further characterized by the following formula:

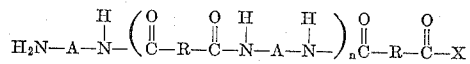

where R and A have the meanings set forth hereinabove, $n$ is an integer which represents the degree of polymerization and X is Cl, OH or OR''' where R''' is an aliphatic hydrocarbon radical, such as an alkyl group, containing 1 to 8 carbon atoms. The value of $n$ can vary widely but is generally in the range of about 5 to about 200. If a slight excess of diamine is used in preparing the polyamide, the end groups thereof will normally be amine groups according to the following formula:

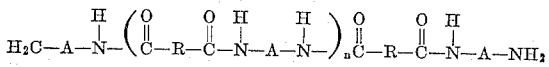

A slight excess of acidic compounds will produce a polymer having the formula:

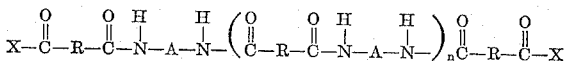

where R, A, $n$ and X have the meanings set forth hereinabove.

The dimer diamines useful in producing the polyamides of the present invention are prepared from dimerized fat acids. Said dimerized fat acids are reacted with ammonia to obtain the corresponding dimerized fat nitrile which is then hydrogenated to the dimer diamine.

Relatively pure dimerized fat acids can be distilled from commercially available polymeric fat acid mixtures. The term "polymeric fat acid" refers to a polymerized fat acid. The term "fat acid" as used herein refers to naturally occurring and synthetic monobasic aliphatic acids having hydrocarbon chains of 8 to 24 carbon atoms. The term "fat acids," therefore, includes saturated, ethylenically unsaturated and acetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to herein as "dimeric fat radical" and "trimeric fat radical."

The saturated, ethylenically unsaturated, and acetylenically unsaturated fat acids are generally polymerized by somewhat different techniques, but because of the functional similarity of the polymerization products, they are all generally referred to as "polymeric fat acids."

Saturated fat acids are difficult to polymerize but polymerization can be obtained at elevated temperatures with a peroxidic catalyst such as di-t-butyl peroxide. Because of the low yields of polymeric products, these materials are not commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include clays, di-t-butyl peroxide, boron trifluoride and other Lewis acids, anthraquinone, sulfur dioxide and the like. Suitable monomers include the branched and straight chain, poly and mono ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, galoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. Acetylenically unsaturated acids occur only rarely in nature and are expensive to synthesize. Therefore, they are not currently of commercial significance. Any acetylenically unsaturated fat acid, both straight chain and branched chain, both mono- and polyunsaturated, are useful for the preparation of the polymeric fat acids. Suitable examples of such materials include 10-undecanoic acid, tariric acid, stearolic acid, behenolic acid and isamic acid.

Because of their ready availability and relative ease of polymerization, oleic acid and linoleic acid $C_{18}$ acids are the preferred starting materials for the preparation of the polymeric fat acids.

The dimerized fat acid is converted to the corresponding dinitriles by reacting the dimerized fat acid with ammonia under nitrile forming conditions. The details of this reaction are set forth in Chapter 2 of "Fatty Acids and Their Derivatives" by A. W. Ralston, John Wiley & Sons, Inc., New York (1948). The dinitrile is then purified by vacuum distillation or other suitable means. After such purification, the dinitrile is hydrogenated to form the dimer diamine which is also purified by vacuum distillation or other suitable means. It is essential that the diamine be of high purity in order to obtain the linear polymers of high molecular weight of the present invention. The dimer diamines employed in the examples to follow are distilled dimer diamines derived from dimerized fat acids consisting essentially of mixtures of dimerized linoleic and oleic acids. Dimerized fat acids of almost any range of dimeric fat acids content can be used, but preferably the dimeric fat acids content should be on the order of 80% or higher.

As indicated above, the dimer diamines are reacted with a suitable aliphatic acidic compound to form the polyamides. Such aliphatic acidic compounds are adipyl and sebacyl chlorides, acids and esters. The esters may be alkyl or aryl such as dimethyl adipate or sebacate, diethyl adipate or sebacate, diphenyl adipate and sebacate and the like.

A portion of the dimer diamine may be replaced by one or more additional diamines, the other diamine having the following general formula:

$$H_2N-R''-NH_2$$

where $R''$ is selected from the group consisting of aliphatic, aromatic and ether containing groups of about 2 to about 20 carbon atoms. Representative of such compounds are:

Ethylene diamine
Propylene diamine
1,2-diaminobutane
1,3-diaminobutane
Trimethylene diamine
Tetramethylene diamine
Pentamethylene diamine
Hexamethylene diamine
Decamethylene diamine
Octadecamethylene diamine
Metaxylene diamine
Paraxylene diamine
Cyclohexylene diamine
Bis-aminoalkyl ethers Other diamines of the above general formula may also be used as well as hydrazine and heterocyclic diamines such as piperazine. The equivalent ratio of the dimer diamine to the above-described second or other diamine may be in the range of 95:5 to 5:95. Ratios of 25:75 to 75:25 are preferred.

The polyamides are prepared by reacting substantially equivalent amounts of the aliphatic or cycloaliphatic acidic compound and the dimer diamine or mixtures thereof with the second diamine. A relatively small excess of either the acidic reactant or the diamine may also be used.

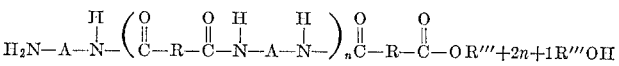

A small excess of diamine will produce a product consisting of relatively long polymeric molecules bearing amino groups at each end. If the product molecule is exceedingly long, it must, of course, be derived from almost exactly equivalent amounts of acidic compounds and diamine. This does not mean, however, in practice that it will be necessary to have the amine and acidic compound present in exactly equivalent amounts initially in order finally to obtain molecules of very great length. A part of the excess diamine or acidic compound may be eliminated by volatilization or otherwise during the course of the reaction so that the ratio of the radicals derived from the two reactants is almost exactly equivalent in the final product.

The polyamides may be prepared from the diamines and an aliphatic or cycloaliphatic acyl chloride by use of interfacial polycondensation. Thus the diamine and chloride are each dissolved in a suitable solvent such as a hydrocarbon, i.e., benzene. The above solutions are then added separate to an aqueous solution of a suitable emulsifier. The aqueous phase should also contain a basic material such as sodium carbonate to neutralize liberated HCl. The hydrocarbon solutions and the aqueous phase are stirred rapidly to form an emulsion and then stripped free of the solvent which breaks the emulsion and causes the polyamide to granulate. The granules are removed by filtration, washed and dried. The reaction is as follows:

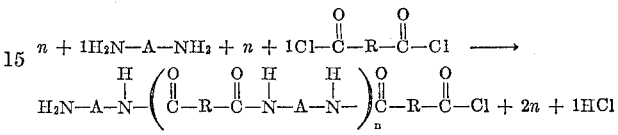

where R, A and $n$ have the same meanings as set forth hereinabove.

The polyamides of the persent invention can also be prepared from the dibasic esters and acids. This reaction is effected by heating the materials at such a temperature that polyaminolysis of the esters or the dehydration of the polyamine salts of the acids will occur rapidly. In general, at the beginning of the reaction, it will be desirable to use temperatures above 120° C. and preferably in the neighborhood of 150° C. to 180° C. The final temperature will usually be above 200° C. and may be as high as 380 to 290° C.

The operating temperatures and time of reaction vary, depending on the nature of the starting materials and the properties desired in the final products. The reaction is usually carried out at atmospheric or greater than atmospheric pressure, although toward the end of the reaction it is advantageous to operate in vacuum. This procedure aids in effecting contact of reaction products and removal of reaction by-products and therefore in driving the reaction toward completion. If desired, the condensation may be effected in the presence of suitable solvents or dispersing media, provided such media do not interact to any appreciable extent with the other components of the mixture and have boiling points sufficiently high to allow the temperature to be maintained at the desired level. Since the amines and esters or acids will have appreciable and, in general, different volatilities it may be necessary to operate under a reflux condenser or in a closed vessel under pressure to reduce the loss of reactants. Also, the more volatile products such as alcohol, phenol, or water can be removed by passage of the distillate through a fractionating tower and returning the less volatile material to the reaction chamber. This procedure will hasten the reaction towards completion. The reaction using equivalent amounts of diamine and ester can be demonstrated by the following:

where R, A, $R'''$ and $n$ have the same meanings as set forth hereinabove.

The invention will be better understood with respect to the following examples which illustrate certain preferred embodiments of the present invention.

EXAMPLE I

To a metal laboratory resin vessel were charged: 271 grams (1.99 moles) of 85.4% aqueous hexamethylene diamine, 126 grams (0.2205 mole) of distilled dimer diamine, 326.5 grams (2.23 moles, 1% molar excess) adipic acid. The metal reactor was flushed with nitrogen and then sealed under nitrogen and heated gradually over 1.5 hours allowing the temperature to rise from 150 to 250° C. The reaction was held at 250 to 270° C. for the next 1.5 hours with gradual venting to the atmosphere to release slowly the pressure caused by the water present in the hexamethylene diamine and that liberated by the reaction. At the end of this time the reactor was put under water pump vacuum (20 mm.) for 1 hour and then under high vacuum for ½ hour. At this point the product was discharged into water from the reactor under a nitrogen atmosphere. The product had an inherent viscosity of 0.789 in metacresol at 30° C.

EXAMPLE II

To 400 ml. of distilled water containing 0.5 g. Duponol ME (an emulsifier consisting mainly of sodium lauryl sulfate in a blender of 1000 ml. capacity were added 200 ml. of benzene containing 1.37 g. (0.005 eq.) of distilled dimer diamine derived from dimerized fat acids having a dimeric fat acids content of 95%, and 14.30 cc. of a 20% solution (0.045 eq.) of hexamethylene diamine (10/90 equivalent ratio). The mixture was stirred and 5.30 g. (0.055 eq.) of $Na_2CO_3$ (10% excess over total equivalents of amine which are used) was added with additional stirring. To the resulting dispersion was added almost all at once a solution of 4.57 g. (0.05 eq.) of distilled adipyl chloride in 150 ml. of benzene. This mixture was stirred rapidly for 2-3 minutes and then striped free of benzene which broke the emulsion and caused the polyamide to granulate. The granules were removed by filtration, washed with hot water until the wash water was free of $Cl^-$ and then dried under water-pump vacuum at 75° C. until a constant weight was obtained. The resulting white, granular polyamide had an inherent viscosity in meta-cresol of 0.783 at 30° C., and a capillary melting point in excess of 255° C.

The close agreement in inherent viscosities between the products of Examples I and II above proves the equivalence of the two methods of preparation. The product of Example I was molded at a pressure of 30,000 pounds ram force (4 inch ram) at a temperature of 260° C. to gave a molded piece that was hard and rigid, with a white, translucent quality.

Several polyamides were prepared by the method of Example II reacting various ratios of dimer diamine and hexamethylene diamine (HMDA) with adipyl chloride and sebacoyl chloride. The properties of the polyamides are shown in the following Table I.

TABLE I

| Example | Acid Compound (Chloride) | Ratio of Equivalents of Dimer Diamine to HMDA | Inherent Viscosity, 30° C. | Capillary Melting Point, ° C. |
|---|---|---|---|---|
| III | Adipyl | 5/95 | 0.816 | 254–258 |
| IV | do | 10/90 | 0.825 | 245 |
| V | do | 25/75 | 0.381 | 244–254 |
| VI | do | 25/75 | 0.475 | >240 |
| VII | Sebacoyl | 5/95 | 0.779 | 213–214 |
| IX | do | 10/90 | 0.881 | 213–214 |
| X | do | 10/90 | 0.775 | 215 |
| XI | do | 25/75 | 0.606 | 200–214 |
| XII | do | 25/75 | 0.488 | 214 |
| XIII | do | 50/50 | 0.404 | 194–210 |
| XIV | do | 100/0 | 0.434 | 156–170 |

Several polyamides were prepared employing the acids or esters in place of the chloride as shown by the following examples.

In these examples the mechanical properties of direct interest in the compositions of the present invention are tensile strength and elongation. These properties are measured on an Instron tensile tester, Model TTC, using ASTM D–1248–58T.

The polymer is molded as a 6″ x 6″ sheet of approximately 0.05 inch thickness, at a temperature near its melting point (usually a few degrees lower than the melting point) and at 2000 lbs. pressure or higher using cellophane as the parting agent in the mold. From this sheet, test specimens are die-cut to conform to ASTM D–412. Gage marks are inscribed in about the center of the test specimen (ink or crayon) approximately 1″ apart.

The test specimen is clamped in the jaws of the Instron. Crosshead speed is usually 2 inches/minute at 100 pounds full scale load. Chart speed is 2 inches/minute. Tensile strength (reference: ASTM D–638–52T) is calculated as:

$$\text{Tensile strength} = \frac{\text{load in pounds at rupture}}{\text{cross sectional area (sq. in.)}}$$

Percent elongation is calculated as:

Percent elongation =

$$\frac{\text{gage length at break} - \text{gage length at 0 load}}{\text{gage length at 0 load}} \times 100$$

In addition to tensile strength and elongation, the following properties were measured on most of the polymers prepared.
(1) Ball and ring melting point—ASTM E28–58T.
(2) Amine and acid numbers—Conventional analytical titration procedures: These are generally defined as the milligrams of potassium hydroxide equivalent to one gram of amine or acids. Except where indicated otherwise, the terms are employed herein in this sense. These may also, however, be expressed in terms of milliequivalents of acid or amine per kilogram of product (meq./kg.).
(3) Inherent viscosity—Defined by equation:

$$\eta_{inh} = \frac{\ln \eta_{rel}}{C}$$

where $C$ = concentration of polymer in grams per 100 mil. of solvent, ln $\eta_{rel}$ = natural logarithm of the relative viscosity of the dilute polymer solution. In the examples below all viscosities are measured in m-cresol at 30° C., usually at a concentration of 1.0 g./100 ml.
(4) Tensile modulus—as defined in ASTM D638–60T.
(5) Toughness—This is taken as the area under the stress-strain curve; cf. Carswell and Nason, Symposium on Plastics, ASTM Philadelphia, February 1944, p. 23.

EXAMPLE XV

Into a reactor equipped with a stirrer, thermocouple and a distillation head is placed 276 grams (0.97 equivalent) of distilled dimer diamine prepared from polymeric fat acids of tall oil having the following analysis:

|   | Percent |
|---|---|
| Monomer (M) | 0.2 |
| Dimer (D) | 98.4 |
| Trimer (T) | 1.4 |

74.6 grams (1.0 equivalent) of adipic acid.

The mixture was heated 1.5 hours at 150–170° C., 0.25 hour at 250° C., and 3 hours under vacuum (ca. <0.1 mm. Hg) at 250° C. The resulting polyamide had the following properties:

| Amine No. (meq./kg.) | 0 |
|---|---|
| Acid No. (meq./kg.) | 110 |
| Ball and ring melting point, ° C. | 120 |
| Inherent viscosity | 0.37 |
| Elongation, percent | 550 |
| Tensile strength (p.s.i.) | 2700 |

EXAMPLE XVI

Into a reactor equipped with a stirrer, thermocouple and a distillation head is placed 285 grams (1.0 equivalent) of the distilled dimeric diamine of Example XV and 74.6 grams (1.0 equivalent) of adipic acid.

The mixture was heated 1¾ hours up to 250° C., 2½ hours at 250° C., and 1¾ hours under vacuum (ca. <0.1 mm. Hg) at 250° C. The resulting polyamide had the following properties:

| Amine No. (meq./kg.) | 24 |
|---|---|
| Acid No. (meq./kg.) | 29 |
| Ball and ring melting point, ° C. | 155 |
| Inherent viscosity | 0.58 |
| Elongation, percent | 100 |
| Tensile strength (p.s.i.) | 4000 |

EXAMPLE XVII

Into a reactor equipped with a stirrer, thermocouple and a distillation head is placed 285 grams (1.0 equivalent) of the distilled dimer diamine of Example XV and 101.1 grams (1.0 equivalent) of sebacic acid.

The mixture was heated ½ hour at 150° C., 2½ hours at 200° C., 1½ hours at 150–250° C., and 1¾ hours under vacuum (ca. <10 mm. Hg) at 250° C. The resulting polyamide had the following properties:

| | |
|---|---|
| Amine No. (meq./kg.) | 45 |
| Acid No. (meq./kg.) | 16 |
| Ball and ring melting point, ° C. | 154 |
| Inherent Viscosity | 0.57 |
| Elongation, percent | 470 |
| Tensile strength (p.s.i.) | 4100 |

EXAMPLE XVIII

Into a reactor equipped with a stirrer, thermocouple and a distillation head is placed 285 grams (1.0 equivalent) of the distilled dimer diamine of Example XV and 99.5 grams (1.0 equivalent) of dimethyl 1,4-cyclohexane dicarboxylate.

The mixture was heated 0.7 hour at 0–150° C., 1.5 hours at 150–250° C., 1.3 hours at 250° C., and 2.1 hours under vacuum (ca. <0.1 mm. Hg) at 250° C. The resulting polyamide had the following properties:

| | |
|---|---|
| Amine No. (meq./kg.) | 218 |
| Acid No. (meq./kg.) | 57 |
| Ball and ring melting point, ° C. | 169 |
| Inherent viscosity | 0.29 |
| Elongation, percent | 125 |
| Tensile strength (p.s.i.) | 1800 |

EXAMPLE XIX

Into a reactor equipped with a stirrer, thermocouple and a distillation head is placed 285 grams (1.0 equivalent) of the distilled dimer diamine of Example XV and 90.4 grams (1.0 equivalent) of suberic acid.

The mixture was heated 1 hour at 150–250° C., 2 hours at 250° C., and 3 hours under vacuum at 250° C. The resulting polyamide had the following properties:

| | |
|---|---|
| Amine No. (meq./kg.) | 25 |
| Acid No. (meq./kg.) | 99 |
| Ball and ring melting point, ° C. | 157 |
| Inherent viscosity | 0.61 |
| Elongation, percent | 500 |
| Tensile strength (p.s.i.) | 4000 |

EXAMPLE XX

Into a reactor equipped with a stirrer, thermocouple and a distillation head is placed 285 grams (1.0) equivalent) of the distilled dimer diamine of Example XV and 99.5 grams (1.0 equivalent) of dimethyl 1,4-cyclohexane dicarboxylate.

The mixture was heated 0.8 hour at 210° C., 1.5 hours at 210–270° C., and 3 hours under vacuum (ca. <0.1 mm. Hg) at 270° C. The resulting polyamide had the following properties:

| | |
|---|---|
| Amine No. (meq./kg.) | 192 |
| Acid No. (meq./kg.) | 29 |
| Ball and ring melting point, ° C. | 167 |
| Inherent viscosity | 0.30 |
| Elongation, percent | 260 |
| Tensile strength (p.s.i.) | 1700 |

EXAMPLE XXI

Into a reactor equipped with a stirrer, thermocouple and a distillation head is placed 285 grams (1.0 equivalent) of distilled dimer diamine prepared from polymeric fat acids of tall oil having the following anaysis:

| | Percent |
|---|---|
| M | 0.3 |
| D | 97.1 |
| T | 2.6 | and 74.7 grams (1.0 equivalent) of adipic acid.

The mixture was heated 1.5 hours at 0–200° C., 0.5 hour at 200–250° C., 0.75 hour at 250° C., and 1 hour under vacuum (ca. 0.2 mm. Hg) at 250° C. The resulting polyamide had the following properties:

| | |
|---|---|
| Amine No. (meq./kg.) | 60 |
| Acid No. (meq./kg.) | 37 |
| Ball and ring melting point, ° C. | 125 |
| Inherent viscosity | 0.58 |
| Elongation, percent | 540 |
| Tensile strength (p.s.i.) | 4000 |

EXAMPLE XXII

Into a reactor equipped wtih a stirrer, thermocouple and a distillation head is placed 279 grams (1.0 equivalent) of distilled dimer diamine prepared from polymeric fat acids of tall oil having the following analysis:

| | Percent |
|---|---|
| M | 0.6 |
| D | 99.4 |
| T | 0 | and 74.7 grams (1.0 equivalent) of adipic acid.

The mixture was heated 2 hours at 100–250° C., 1½ hours at 250° C., and 2½ hours under vacuum (ca. <0.1 mm. Hg) at 250° C. The resulting polyamide had the following properties:

| | |
|---|---|
| Amine No. (meq./kg.) | 25 |
| Acid No. (meq./kg.) | 28 |
| Ball and ring melting point, ° C. | 146 |
| Inherent viscosity | 0.56 |
| Elongation, percent | 470–540 |
| Tensile strength (p.s.i) | 3200–3500 |

EXAMPLE XXIII

Into a reactor equipped with a stirrer, thermocouple and a distillation head is placed 279 grams (1.0 equivalent) of the distilled dimer diamine of Example XXII and 86.3 grams (1.0 equivalent) of 1,4-cyclohexane dicarboxylic acid.

The mixture was heated 1½ hours at 100–250° C., 1½ hours at 250° C., and 3 hours under vacuum (ca. <0.1 mm. Hg) at 250° C. The resulting polyamide had the following properties:

| | |
|---|---|
| Amine No. (meq./kg.) | 67 |
| Acid No. (meq./kg.) | 32 |
| Ball and ring melting point, ° C. | 200 |
| Inherent viscosity | 0.49 |
| Elongation, percent | 290 |
| Tensile strength (p.s.i.) | 3300 |

EXAMPLE XXIV

Into a reactor equipped with a stirrer, thermocouple and a distillation head is placed 276 grams (1.0 equivalent) of the distilled dimer diamine of Example XXII and 73.1 grams (1.0 equivalent) of diethyl oxalate.

The mixture was heated 1½ hours at 150–250° C., ½ hour at 250° C., and 4 hours under vacuum (ca. <0.1 mm. Hg) at 250° C. The resulting polyamide had the following properties:

| | |
|---|---|
| Amine No. (meq./kg.) | 46 |
| Acid No. (meq./kg.) | 1.3 |
| Ball and ring melting point, ° C. | 100 |
| Inherent viscosity | 0.375 |
| Elongation, percent | 600 |
| Tensile strength (p.s.i.) | 1500 |

EXAMPLE XXV

Into a reactor equipped with a stirrer, thermocouple and a distillation head is placed 276 grams (1.0 equivalent) of the distilled dimer diamine of Example XXII and 86.3 grams (1.0 equivalent) of 1,4-cyclohexane dicarboxylic acid.

The mixture was heated 1¼ hours at 100–250° C., 1¾ hours at 250° C., and 3 hours under vacuum (ca. <0.2 mm. of Hg) at 250° C. The resulting polyamide had the following properties:

| | |
|---|---|
| Amine No. (meq./kg.) | 19 |
| Acid No. (meq./kg.) | 42 |
| Ball and ring melting point, ° C. | 191 |
| Inherent viscosity | 0.53 |
| Elongation, percent | 320 |
| Tensile strength (p.s.i.) | 3600 |

Water absorption tests at room temperature were also made. The results of the tests can be seen from the following Table I.

*Table I*

| | Example | | |
|---|---|---|---|
| | XIX | XXII | XXV |
| 24 hours | 0.15 | 0.15 | 0.13 |
| 1 week | 0.34 | 0.37 | 0.28 |
| 2 weeks | | | 0.35 |
| 3 weeks | 0.50 | 0.59 | 0.37 |
| 4 weeks | 0.54 | 0.68 | |
| 5 weeks | 0.57 | 0.76 | |
| 6 weeks | 0.61 | 0.84 | |
| 7 weeks | 0.61 | 0.84 | |
| 8 weeks | | 0.95 | |

It is to be understood that the invention is not to be limited to the exact details of operation of the exact compositions shown and described, as obvious modifications and equivalents will be apparent to those skilled in the art and the invention is to be limited only by the scope of the appended claims.

The embodiments of the invention in which an exclusive property or privilege is claimed are defined as follows:

1. A linear polyamide having low water absorption and consisting of recurring structural units, said units having the following general formula:

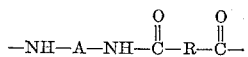

in which R is selected from the group consisting of aliphatic and cycloaliphatic hydrocarbon radicals having from 2 to 20 carbon atoms and A is selected from the group consisting of R′ and mixtures of R′ and R″ where R′ is the dimeric fat radical of a polymerized aliphatic hydrocarbon monocarboxylic acid having 18 carbon atoms and R″ is a hydrocarbon radical of a second diamine having from 2 to 20 carbon atoms.

2. A linear polyamide as defined in claim 1 in which R′ is the dimeric fat radical of polymerized tall oil fatty acids.

3. A linear polyamide having low water absorption and having the formula

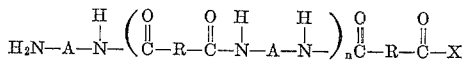

where R is selected from the group consisting of aliphatic and cycloaliphatic hydrocarbon radicals having from 2 to 20 carbon atoms and A is selected from the group consisting of R′ and mixtures of R′ and R″ where R′ is a dimeric fat radical of a polymerized aliphatic hydrocarbon monocarboxylic acid having 18 carbon atoms and R″ is a hydrocarbon radical of a second diamine having from 2 to 20 carbon atoms; X is selected from the group consisting of Cl, OH, and OR‴ where R‴ is an aliphatic hydrocarbon radical having from 1 to 8 carbon atoms and $n$ is an integer representing the degree of polymerization.

4. A linear polyamide having low water absorption and having the formula

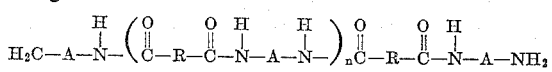

where R is selected from the group consisting of aliphatic and cycloaliphatic hydrocarbon radicals having from 2 to 20 carbon atoms and A is selected from the group consisting of R′ and mixtures of R′ and R″ where R′ is a dimeric fat radical of a polymerized aliphatic hydrocarbon monocarboxylic acid having 18 carbon atoms and R″ is a hydrocarbon radical of a second diamine having from 2 to 20 carbon atoms and $n$ is an integer of about 5 to about 200.

5. A linear polyamide as defined by claim 1 wherein A is R′.

6. A linear polyamide as defined in claim 1 wherein A is a mixture of R′ and R″.

7. A linear polyamide as defined in claim 1 wherein the ratio of R′ radicals to R″ is about 95:5 to 5:95.

8. A linear polyamide as defined in claim 2 wherein $n$ is about 5 to about 200.

9. A linear polyamide as defined in claim 2 where A is R′.

References Cited by the Examiner

UNITED STATES PATENTS

| | | | |
|---|---|---|---|
| 2,130,523 | 9/1938 | Carothers | 260—78 |
| 2,190,770 | 2/1940 | Carothers | 260—78 |
| 2,388,035 | 10/1945 | Frosch | 260—78 |
| 2,450,940 | 10/1948 | Cowan et al. | 260—78 |
| 2,831,834 | 4/1958 | Magat | 260—78 |
| 3,023,243 | 2/1962 | Stansbury et al. | 260—78 |

WILLIAM H. SHORT, *Primary Examiner.*